Nov. 11, 1924.
1,515,485
W. H. HOPE
ENGRAVING MACHINE
Filed Sept. 28, 1923     2 Sheets-Sheet 1
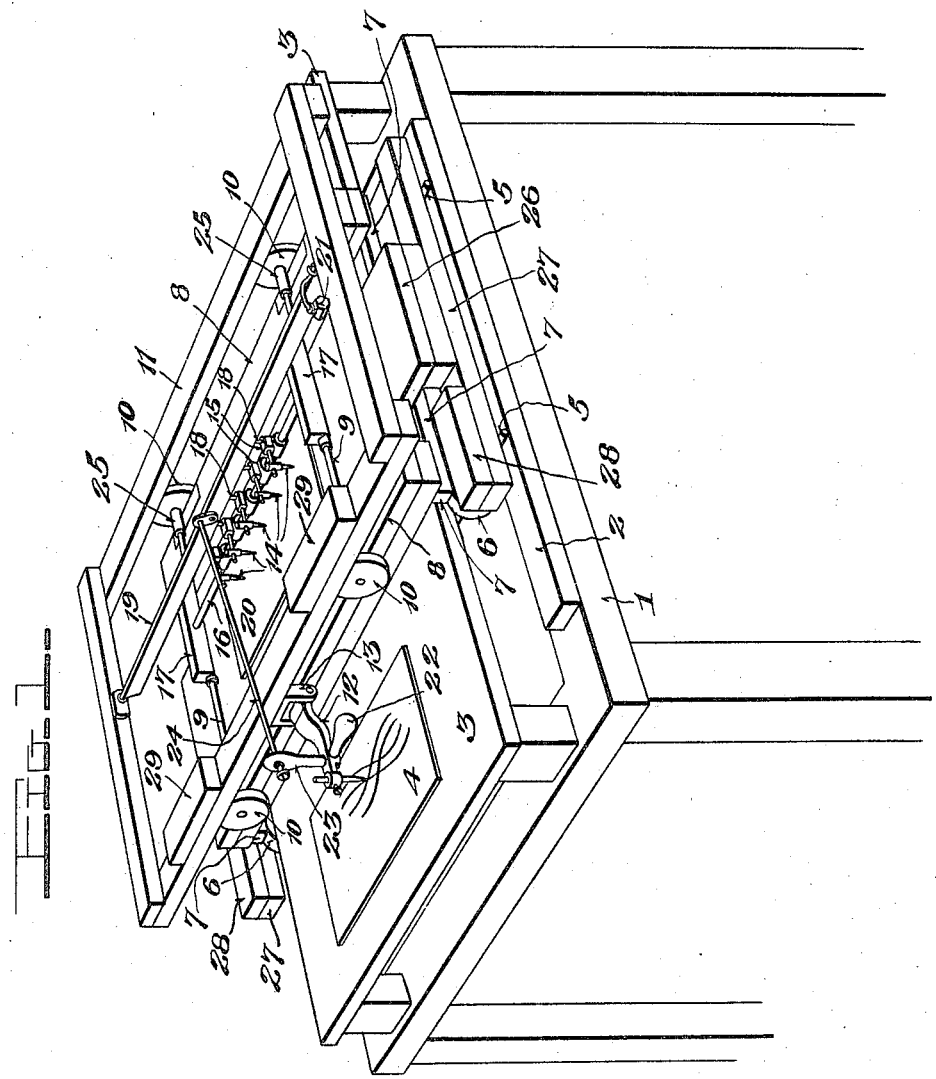
Inventor
William H. Hope
By Joseph A. Miller
Attorney Nov. 11, 1924.
W. H. HOPE
ENGRAVING MACHINE
Filed Sept. 28, 1923
1,515,485
2 Sheets-Sheet 2
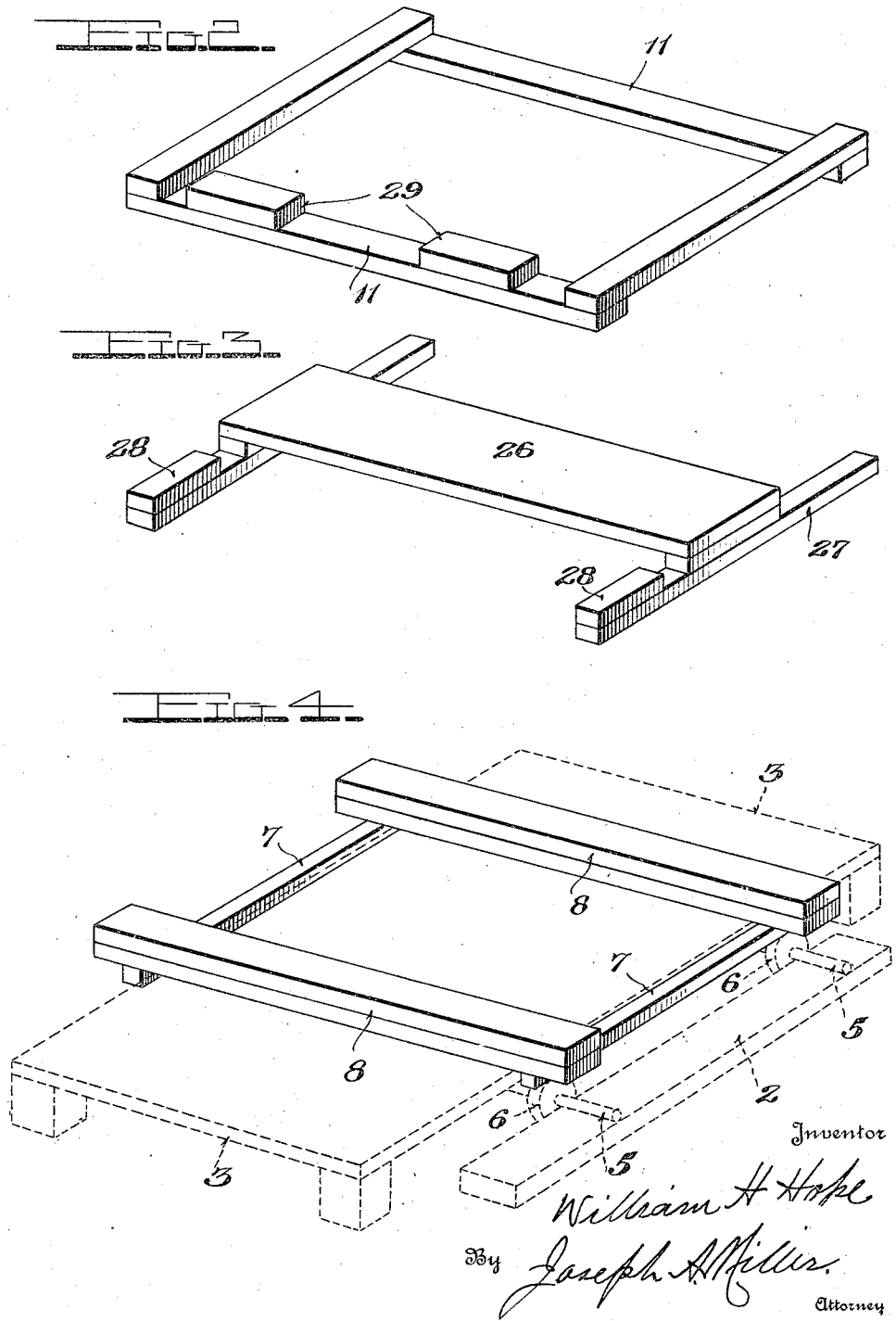

Patented Nov. 11, 1924.

1,515,485

UNITED STATES PATENT OFFICE.

WILLIAM H. HOPE, OF PROVIDENCE, RHODE ISLAND.

ENGRAVING MACHINE.

Application filed September 28, 1923. Serial No. 665,350.

*To all whom it may concern:*

Be it known that I, WILLIAM H. HOPE, a citizen of the United States, residing at Providence, in the county of Providence and State of Rhode Island, have invented new and useful Improvements in an Engraving Machine, of which the following is a specification.

This invention relates to certain new and useful improvements in an engraving machine and especially to the pantograph type, the primary object being to provide a machine for engraving flat work.

A further object is to provide a novel pantograph movement and mounting for a plurality of cutting tools.

The invention further resides in the features of construction and the arrangements and combinations of parts hereinafter described and claimed, reference being made to the accompanying drawing wherein:

Figure 1 is a perspective view of a machine embodying the present invention;

Figure 2 is a detail perspective view of the top carriage;

Figure 3 is a like view of the work supporting carriage; and

Figure 4, is a similar view of the bottom carriage, showing its mounting arrangement.

Referring more in detail to the accompanying drawing, the bed or supporting frame structure 1 is provided on opposite sides with parallel rails 2 and therebetween, and toward the forward end, with a platen 3 on which is arranged the design 4 to be copied. Operating on the rails 2 are the rollers 5 which preferably constitute the terminal portions of shafts spanning the interval between the rails. Fixed on the shafts or rollers 5 adjacent each end and between the rails is a wheel 6 of larger diameter and on which rides the lower or longitudinally movable carriage which consists of lengthwise wheel rails 7 connecting the transverse rails 8. The transverse pair of rails 8 are traversed by the shafts or rollers 9 having wheels 10 fixed on their ends beyond the rails for supporting the upper or transversely moving carriage 11.

The stylus is carried at the free end of an arm 12 which is pivoted to a bracket 13 depending from the front rail of the upper carriage. The cutters 14 are carried on arms 15 which are mounted on a shaft 16 whose ends are journaled in fittings or bearings 17 loosely supported on the shafts 9. Each cutter mounting 15 is equipped with an upstanding finger 18 designed to be engaged by a rocker bar 19 for lifting the cutters from the work 20. The rocker bar is journaled in the sides of the upper carriage and is provided with a spring stop 21 for engaging the upper carriage to position the cutters normally. The stylus arm is provided with a control handle 22 and also an upright 23 which loosely supports a link 24 connected to the rocker bar 19 whereby on pulling the free end of the link outwardly the several cutters will be elevated.

The work is supported on an intermediate carriage 26 which is disposed between the transverse rails 8 of the bottom carriage and has its ends extended beyond the longitudinal rails 7 for being supported by other longitudinal rails 27 riding on the rollers 5. Weights 28 are mounted on the rails 27 while similar weights 29 are arranged on the top carriage for holding the respective carriages firmly on their rotatable supports.

In the arrangement of the several carriages, the bottom carriage is mounted to sufficiently clear the platen 3 in its movement thereover, and likewise, the work-supporting carriage 26 is blocked up or mounted to give sufficient clearance to pass over the rails 7 of said bottom carriage.

In operation, the design is traced by the stylus, as usual through the three carriage mountings according to a predetermined variation, the lower carriage carrying the upper carriage in a longitudinal direction and the latter moving on the lower carriage during transverse or cross movement, the degree of difference between the movements of the driving and driven parts being proportionate to the ratio of the wheels to their respective shafts or rollers. This ratio, and consequently the variance between the pattern and the work, may be varied by increasing the diameter of the shaft, for example with a sleeve 25. The rollers may therefore be considered as wheels or the larger wheels may likewise be considered as rollers. During the longitudinal movement of the bottom carriage, the work supporting carriage will also move in a parallel direction but at a slower speed by reason of its mounting on the rollers 5. The result on the work will therefore, be modified not only in accordance with the relative movements of the top and bottom carriages, but also with the additional modification effected by the slowly intermediate carriage. The lifting or lowering of the cutters on to the work is accomplished by link 24.

With this improved machine it is possible to chase or engrave flat work with a series of reduced or enlarged forms for printing purposes and like use.

Having thus described my invention, what I claim as new and desire to secure by Letters Patent is:—

1. In a pantograph, a supporting frame having spaced rail portions, shafts spanning the interval between the rail portions with terminal rollers operating thereover, wheels mounted on the shaft in operative relation to the rollers, and a carriage supported to ride on the wheels.

2. In a pantograph, a supporting frame having spaced rail portions, shafts spanning the interval between the rail portions with terminal rollers operating thereover, wheels mounted on the shaft in operative relation to the rollers, a carriage supported to ride on the wheels and provided with spaced rail portions arranged transversely of the first rail portions, shafts having roller portions operating over the latter rail portions, wheels mounted on the second shafts to operate with their roller portions, and a carriage mounted to ride the second wheels.

3. In a pantograph, a supporting frame having spaced rail portions, shafts spanning the interval between the rail portions with terminal rollers operating thereover, wheels mounted on the shaft in operative relation to the rollers, a carriage supported to ride on the wheels and provided with spaced rail portions arranged transversely of the first rail portions, shafts having roller portions operating over the latter rail portions, wheels mounted on the second shafts to operate with their roller portions, a carriage mounted to ride the second wheels, and a cutter support arranged between and mounted on second shafts.

4. In a pantograph, a supporting frame having spaced rail portions, shafts spanning the interval between the rail portions with terminal rollers operating thereover, wheels mounted on the shaft in operative relation to the rollers, a carriage supported to ride on the wheels and provided with spaced rail portions arranged transversely of the first rail portions, shafts having roller portions operating over the latter rail portions, wheels mounted on the second shafts to operate with their roller portions, a carriage mounted to ride the second wheels, bearings on the second shafts, a cutter mounted on the bearings, and a stylus carrier connected to the second carriage.

5. In a pantograph, a supporting frame having spaced rail portions, shafts spanning the interval between the rail portions with terminal rollers operating thereover, wheels mounted on the shaft in operative relation to the rollers, a carriage supported to ride on the wheels and provided with spaced rail portions arranged transversely of the first rail portions, shafts having roller portions operating over the latter rail portions, wheels mounted on the second shafts to operate with their roller portions, a carriage mounted to ride the second wheels, bearings on the second shafts, a cutter mounted on the bearings and provided with a rockable finger, a rocker bar mounted on the second carriage to actuate the finger to move the cutter support to inoperative position, and means for actuating the rocker bar.

6. In a pantograph, a supporting frame having spaced rail portions, shafts spanning the interval between the rail portions with terminal rollers operating thereover, wheels mounted on the shaft in operative relation to the rollers, a carriage suported to ride on the wheels and provided with spaced rail portions arranged transversely of the first rail portions, shafts having roller portions operating over the latter rail portions, wheels mounted on the second shafts to operate with their roller portions, a carriage mounted to ride the second wheels, bearings on the second shafts, a cutter mounted on the bearings and provided with a rockable finger, a rocker bar mounted on the second carriage to actuate the finger to move the cutter support to inoperative position, a stylus carrier movably connected to the second carriage, and means movable by the stylus carrier for actuating the rocker bar when the carrier is moved to inoperative position.

7. A pantograph comprising, a flat work support, a plurality of cutters operable thereover, a carriage, means supporting the carriage for horizontal movement a stylus carrier connected to the carriage, means supporting the cutters from said carriage, and means operable by the stylus carrier for rendering the cutters inoperative upon moving the carrier from the design.

8. A pantograph comprising a carriage means supporting the same for movement, a cutter support rockably carried by said means, means carried by the carriage for rocking the support, and a stylus carrier connected to the carriage and to the support for rendering the cutters and stylus simultaneously inoperative.

9. A pantograph comprising a supporting frame having spaced rails, a pair of shafts mounted to roll on said rails, a work-supporting carriage movably supported on the terminal portions of the shafts, a bottom carriage movably mounted on the intermediate portions of the shafts, and a cutter-supporting carriage mounted for transverse movement on the bottom carriage.

10. In a pantograph, a supporting frame having spaced rail portions, shafts spanning the interval between the rail portions with terminal rollers operating thereover, wheels mounted on the shaft in operative relation to the rollers, a carriage supported to ride on the wheels and provided with spaced rail portions arranged transversely of the first rail portions, shafts having roller portions operating over the latter rail portions, wheels mounted on the second shafts to operate with their roller portions, a carriage mounted to ride the second wheels, a cutter supported on the second carriage, and a work-supporting carriage interposed between the first two carriages and supported on the terminal rollers of the first shafts.

In testimony whereof I have signed my name to this specification in the presence of two subscribing witnesses.

WILLIAM H. HOPE.

Witnesses:
S. N. BARRY,
J. A. MILLER.